Jan. 18, 1938. P. A. RAICHE 2,106,018
APPARATUS FOR THE MANUFACTURE OF RUBBER TUBING
Original Filed Jan. 30, 1932
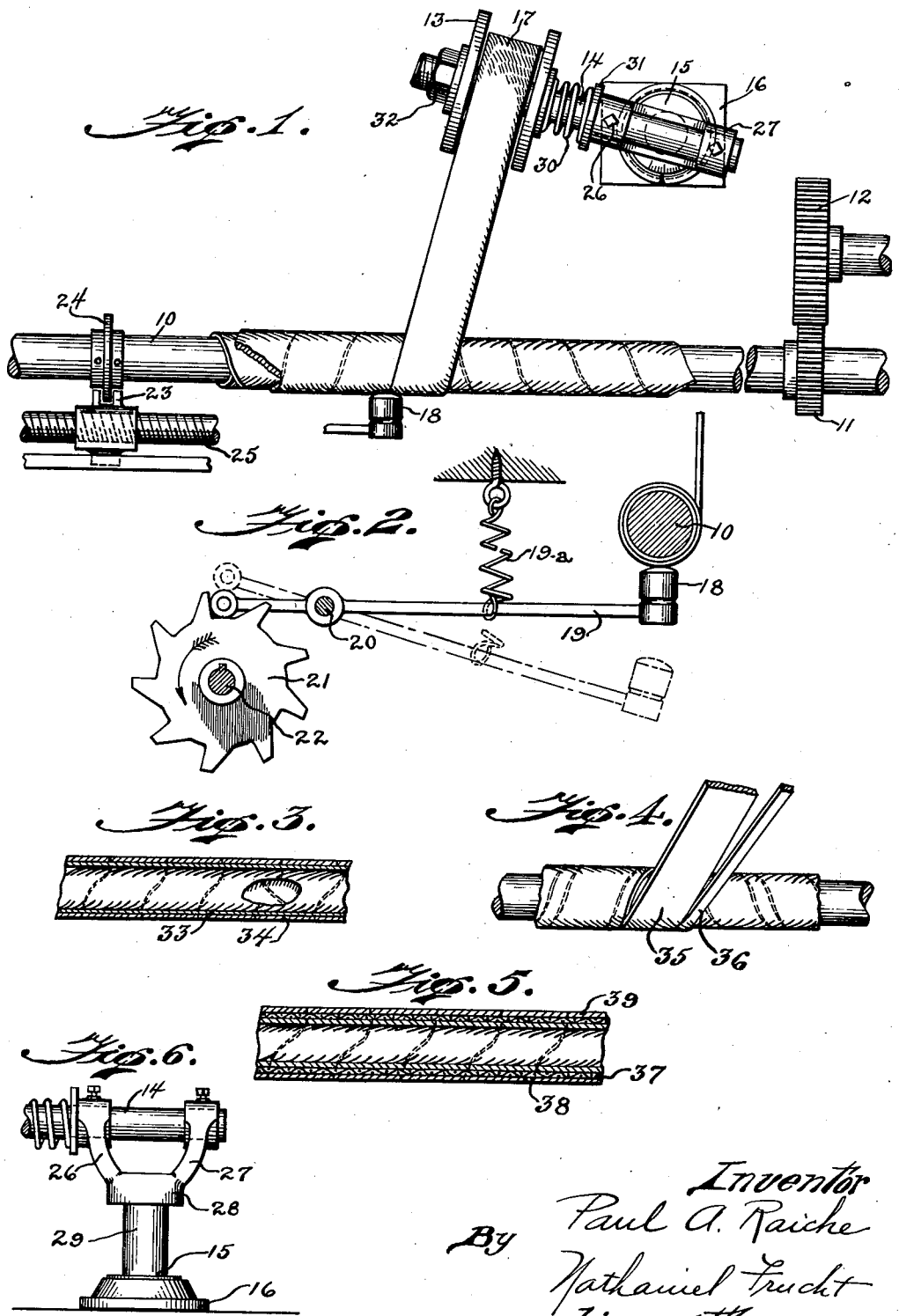
Inventor
Paul A. Raiche
By Nathaniel Frucht
his Attorney Patented Jan. 18, 1938

2,106,018

UNITED STATES PATENT OFFICE 2,106,018

APPARATUS FOR THE MANUFACTURE OF RUBBER TUBING

Paul A. Raiche, Providence, R. I., assignor to Davol Rubber Co., a corporation of Rhode Island Original application January 30, 1932, Serial No. 589,835, now Patent No. 1,940,145, dated December 19, 1933. Divided and this application November 21, 1933, Serial No. 699,010

9 Claims. (Cl. 154—6)

This application is a division of my copending application Ser. No. 589,835 filed January 30, 1932, Patent 1,940,145 Dec. 19, 1933, for Method for the manufacture of rubber tubing.

My present invention relates to the manufacture of rubber articles, and has particular reference to the manufacture of rubber tubing.

Rubber tubing has hitherto been made from flat stock drawn through an opening in a movable plate, which opening is substantially the outside diameter of the finished tubing, and has comprised a longitudinal seam welded by the use of a welding flux and heat. The principal objects of my invention are to utilize an improved apparatus for welding a seam of contiguous edges of rubber by a novel application of pressure.

The longitudinal seam of commercial rubber tubing forms a structural weakness, on account of the difficulty in producing perfect welds commercially, has a tendency to open under pressure, and has hindered the use of rubber tubing for pressure fluids, unless reinforced by fabric or the like. It is an additional object of my invention to provide an improved construction of rubber tubing that has no longitudinal seams, and that will withstand substantial internal pressure without use of a reinforcing material.

The manufacture of rubber tubing having a plurality of layers has heretofore failed to utilize the full strength of the rubber layers as supports for each other, because the commercial manufacture has resulted in layers having parallel grain. A further object of my invention is to provide a construction whereby the rubber layers will have their grain on a bias, thus increasing the strength of the tubing and providing a maximum support for each layer.

With the above and other objects and advantageous features in view, the invention comprises a novel apparatus for producing strong, integral rubber tubing, more fully described in the detailed description following, in conjunction with the accompanying drawing, and more particularly specified in the appended claims.

In the drawing:

Fig. 1 is a fragmentary elevation of the apparatus for producing the tubing;

Fig. 2 is a side view of the welding hammer and the actuating mechanism therefor;

Fig. 3 is a section through a rubber tube formed in accordance with the invention;

Fig. 4 is a fragmentary view similar to Fig. 1, showing the formation of striped tubing;

Fig. 5 is a view similar to Fig. 3, but showing an intermediate layer of fabric reinforcement; and Fig. 6 is an elevation of the carrier roll frame.

Referring to the drawing, the mandrel 10 is rotatably mounted in any suitable manner in a horizontal position, and is actuated through pinion 11 by a power gear 12. A carrier roll 13 for rubber is mounted for rotary movement on a shaft 14 which is held in a standard 15 swivelly mounted on a base 16.

The carrier roll contains a roll of rubber ribbon 17, which is spirally wound on the mandrel as the roll and the mandrel rotate. The contiguous seams formed by the edges of the ribbons are subjected to the hammering action of a rapidly oscillating hammer 18, which is supported on an arm 19 pivotally mounted as at 20. The arm is spring pressed upwardly by a tension spring 19a to bring the hammer against the seam, and the hammer is periodically positively swung into hammering position against the tension of the spring by a toothed actuating wheel 21 which is splined on a rotatable shaft 22. Preferably, the mandrel is splined in its pinion, and is shifted longitudinally by any desired mechanism of usual type, as by a flyer 23 engaging a flange 24 on the mandrel and threaded on a screw 25, so as to always bring the seam formed by the contiguous edges of the ribbon over the hammer head; but it is a matter of mechanical expediency, if desired, to shift the carrier roll and the hammering mechanism, instead of the mandrel.

As shown in Figs. 1 and 4, the shaft 14 is securely held in the spaced bearings 26, 27 of the bearing yoke 28, which is mounted on the center post 29 of the standard 15. The carrier roll 13 is mounted on the end of the shaft 14 against a spring 30, which is thus pressed against a flange 31 fixed on the shaft 14 at one end, and resiliently holds the carrier roll against the retaining nut 32 on the threaded end of the shaft to exert a slight, controlled resistance to turning of the carrier roll. The swivel movement is for the purpose of controlling the angle of feed of the rubber ribbon.

It has been found that a moderate reciprocation of the hammer under a moderate spring pressure is sufficient to produce a perfect weld without use of a bonding agent; it may be desirable, however, to also utilize rubber bonding material or cement between the contiguous edges of the seam, in order to ensure success of the weld. The formed tubing is finished by treating and curing in the usual manner.

If a multilayer tubing is desired, the manufacture is easily accomplished by reversing the mandrel rotation, thus forming each layer with its welded seams across the welded seam of the preceding layer as indicated at 33, 34 in Fig. 3; the construction is therefore extremely strong and able to withstand substantial pressure.

The above described welding method is particularly applicable for the manufacture of striped tubing, as indicated in Fig. 4. The large rubber ribbon 35 and the small rubber ribbon 36 are of different colors, and the resulting tubing is a homogeneous tubing having an easily distinguished spiral stripe.

When the tubing is to be used for quite high pressure fluids, a fabric layer 37 may be utilized, as indicated in Fig. 5, as a reinforcing material between two layers 38, 39 of rubber. Other constructional variations similar to those now used may similarly be utilized.

The described apparatus may be modified to weld sheets of raw rubber stock together, as by using parallel carrier rolls, or by utilizing a hammer movable over a flat surface on which the sheets are placed. This procedure is desirable when the completed sheet is to be formed of portions having different grain direction, and particularly when a laminated construction is to be formed of sheets which have different grain direction.

The use of layers of different grain direction is very effective in the case of tubing, as the resulting tubing is easily and inexpensively manufactured, is very strong, is homogeneous, and is very resistant to internal pressure.

While I have described a specific apparatus for producing the improved tubing, it is obvious that such changes in the arrangement and size of the parts, and in the arrangement, the character, and the material of the tubing layers, may be made as appear desirable, within the spirit and the scope of the appended claims.

I claim:

1. In a machine for forming rubber tubes, a rotatable mandrel, a rotatable carrier roll shaft mounted adjacent to said mandrel and adapted to carry a spool of strip rubber, mechanism for rotating said mandrel, a reciprocable hammer mounted adjacent said mandrel for hammering the seams of the strip rubber after it is wound on said mandrel, and mechanism for relatively shifting the mandrel and hammer longitudinally along the axis of said mandrel.

2. In a machine for forming rubber tubes, a rotatable mandrel, a rotatable carrier roll shaft mounted adjacent to said mandrel and adapted to carry a spool of strip rubber, mechanism for rotating said mandrel, a reciprocable hammer mounted adjacent said mandrel, said hammer being adapted to engage the seams of strip rubber on the rotating mandrel and mechanism for shifting said mandrel axially.

3. In a machine for forming rubber tubes, a rotatable mandrel, a rotatable carrier roll shaft mounted adjacent to said mandrel and adapted to carry a spool of strip rubber, mechanism for rotating said mandrel, a hammer device comprising a rod and a head, the rod being pivotally mounted to position the hammer head adjacent said mandrel, a spring engaging said rod to force said head towards said mandrel, said hammer being adapted to engage the seams of strip rubber on the rotating mandrel and mechanism for intermittently forcing said head away from said mandrel.

4. In a machine for forming rubber tubes, a rotatable mandrel, a rotatable carrier roll shaft mounted adjacent to said mandrel and adapted to carry a spool of strip rubber, said carrier roll shaft being adjustable to a predetermined angular relation with respect to said mandrel, mechanism for rotating said mandrel, and a reciprocable hammer mounted adjacent said mandrel, said hammer being adapted to engage the seams of strip rubber on the rotating mandrel.

5. In a machine for forming rubber tubes, a rotatable mandrel, a rotatable carrier roll shaft mounted adjacent to said mandrel and adapted to carry a spool of strip rubber, said carrier roll shaft being adjustable to a predetermined angular relation with respect to said mandrel, mechanism for rotating said mandrel, a reciprocable hammer mounted adjacent said mandrel, said hammer being adapted to engage the seams of strip rubber on the rotating mandrel and mechanism for shifting said mandrel axially.

6. In a machine for forming rubber tubes, a rotatable mandrel, a rotatable carrier roll shaft mounted adjacent to said mandrel and adapted to carry a spool of strip rubber, said carrier roll shaft being adjustable to a predetermined angular relation with respect to said mandrel, mechanism for rotating said mandrel, a hammer device comprising a rod and a head, the rod being pivotally mounted to position the hammer head adjacent said mandrel, a spring engaging said rod to force said head towards said mandrel, said hammer being adapted to engage the seams of strip rubber on the rotating mandrel and mechanism for intermittently forcing said head away from said mandrel.

7. In a machine for forming rubber tubes, a rotatable mandrel, a rotatable carrier roll shaft mounted adjacent to said mandrel, a carrier roll for strip rubber rotatably mounted on said shaft, means for tensioning the rotation of said carrier roll, mechanism for rotating said mandrel, and a reciprocable hammer mounted adjacent said mandrel, said hammer being adapted to engage the seams of strip rubber on the rotating mandrel.

8. In a machine for forming rubber tubes, a rotatable mandrel, a rotatable carrier roll shaft mounted adjacent to said mandrel, a carrier roll for strip rubber rotatably mounted on said shaft, means for tensioning the rotation of said carrier roll, mechanism for rotating said mandrel, a reciprocable hammer mounted adjacent said mandrel, said hammer being adapted to engage the seams of strip rubber on the rotating mandrel and mechanism for shifting said mandrel axially.

9. In a machine for forming rubber tubes, a rotatable mandrel, a rotatable carrier roll shaft mounted adjacent to said mandrel, a carrier roll for strip rubber rotatably mounted on said shaft, means for tensioning the rotation of said carrier roll, mechanism for rotating said mandrel, a hammer device comprising a rod and a head, the rod being pivotally mounted to position the hammer head adjacent said mandrel, a spring engaging said rod to force said head towards said mandrel, and mechanism for intermittently forcing said head away from said mandrel, said hammer being adapted to engage the seams of strip rubber on the rotating mandrel.

PAUL A. RAICHE.